US008917491B2

(12) United States Patent
Masuda et al.

(10) Patent No.: US 8,917,491 B2
(45) Date of Patent: Dec. 23, 2014

(54) POROUS CAPACITOR (71) Applicant: Taiyo Yuden Co., Ltd., Tokyo (JP)

(72) Inventors: Hidetoshi Masuda, Tokyo (JP); Kenichi Ota, Tokyo (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 81 days.

(21) Appl. No.: 13/849,204

(22) Filed: Mar. 22, 2013

(65) Prior Publication Data

US 2013/0321984 A1 Dec. 5, 2013

(30) Foreign Application Priority Data

Mar. 26, 2012 (JP) ................................ 2012-069254

(51) Int. Cl.
| | |
|---|---|
| H01G 4/06 | (2006.01) |
| H01G 9/15 | (2006.01) |
| H01G 4/30 | (2006.01) |
| H01G 9/045 | (2006.01) |
| H01G 9/048 | (2006.01) |
| H01G 9/07 | (2006.01) |
| H01G 4/232 | (2006.01) |
| H01G 4/10 | (2006.01) |

(52) U.S. Cl.
CPC ................ *H01G 9/15* (2013.01); *H01G 4/302* (2013.01); *H01G 9/045* (2013.01); *H01G 9/048* (2013.01); *H01G 9/07* (2013.01); *H01G 4/232* (2013.01); *H01G 4/2325* (2013.01); *H01G 4/10* (2013.01)
USPC .................. 361/321.1; 361/301.2; 361/301.4; 361/306.1; 361/306.3; 361/321.2

(58) Field of Classification Search
CPC ......... H01G 4/10; H01G 4/232; H01G 4/005; H01G 4/018
USPC .............. 361/303, 305, 311, 312, 313, 301.2, 361/301.4, 306.1, 306.3
See application file for complete search history.

(56) References Cited

U.S. PATENT DOCUMENTS

| | | | | |
|---|---|---|---|---|
| 8,023,249 | B2 * | 9/2011 | Masuda et al. | 361/303 |
| 8,385,046 | B2 * | 2/2013 | Palusinski et al. | 361/303 |
| 2013/0201604 | A1 * | 8/2013 | Masuda | 361/303 |

FOREIGN PATENT DOCUMENTS

JP        2009-088034        4/2009

* cited by examiner

*Primary Examiner* — Nguyen T Ha
(74) *Attorney, Agent, or Firm* — Pillsbury Winthrop Shaw Pittman, LLP (57) ABSTRACT

One object is to provide a porous capacitor having increased insulation reliability. In accordance with one aspect, the porous capacitor includes: a first conductor layer and a second conductor layer opposed to each other at a predetermined distance; a dielectric layer made of an oxidized valve metal and disposed between the first conductor layer and the second conductor layer; a large number of holes formed through the dielectric layer and oriented substantially orthogonal to the first conductor layer and the second conductor layer; and first electrodes and second electrodes formed of a conductive material filled in the holes; and insulation parts insulating the first electrodes from the second conductor layer and insulating the second electrodes from the first conductor layer. The thicknesses of the first conductor layer and the second conductor layer are equal to or greater than half of the inner diameter of the holes.

4 Claims, 6 Drawing Sheets

POROUS CAPACITOR

CROSS-REFERENCE TO RELATED APPLICATIONS

This application is based on and claims the benefit of priority from Japanese Patent Application Serial No. 2012-69254 (filed on Mar. 26, 2012), the contents of which are hereby incorporated by reference in their entirety.

TECHNICAL FIELD

The present invention relates to a capacitor, particularly to an improved porous capacitor having increased capacitance.

BACKGROUND

As a related art of the present invention, Japanese Patent No. 4493686, for example, discloses a porous capacitor in which a plurality of substantially columnar holes are formed in a dielectric layer provided between a pair of conductor layers opposed to each other at a predetermined interval, an electrode material is filled in these holes to form first electrodes and second electrodes, and the first electrodes are electrically connected only to one of the conductor layers, while the second electrodes are electrically connected only to the other conductor layer.

Figure 6:
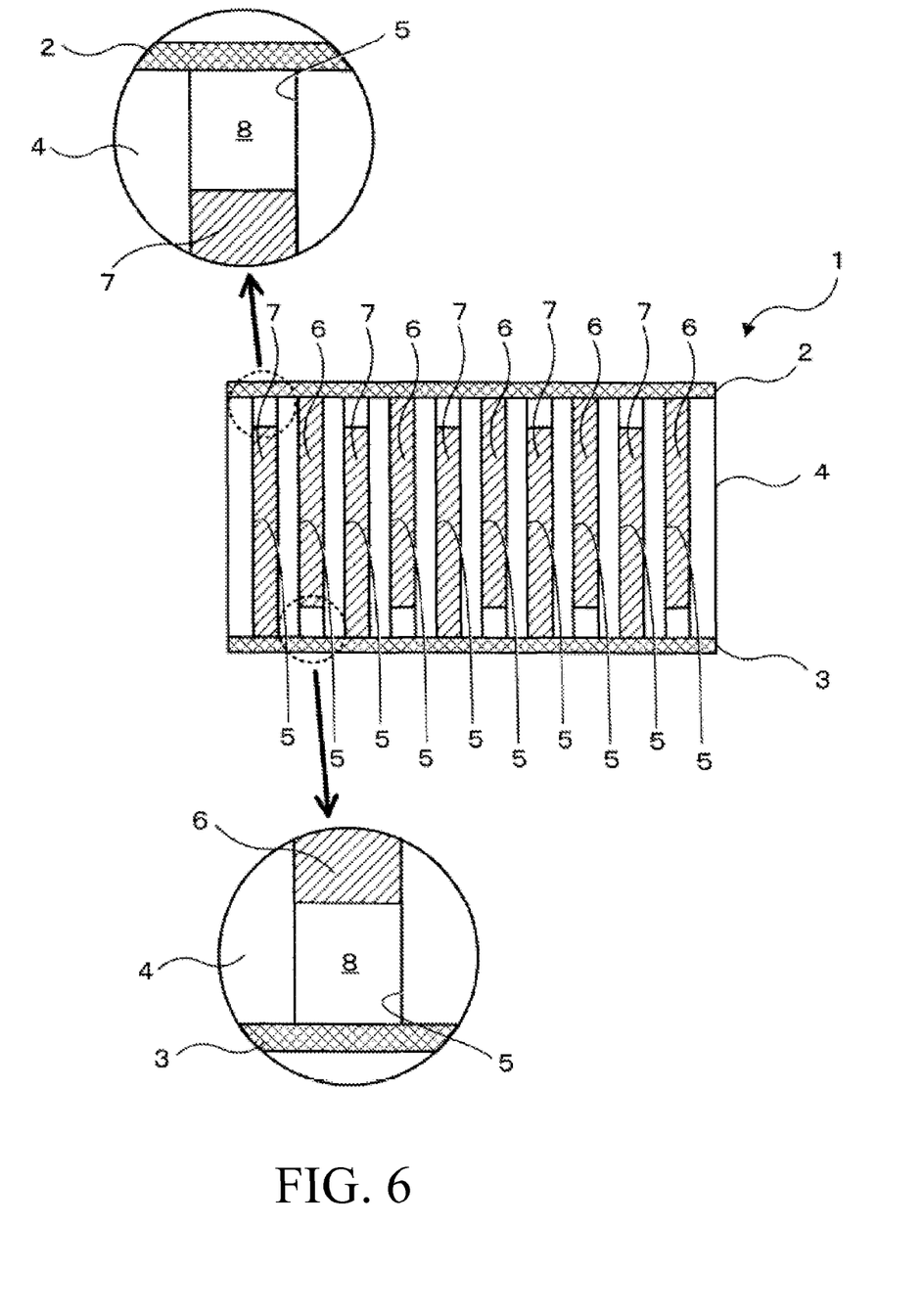
FIG. 6 is a schematic diagram of the porous capacitor of the related art.

FIG. 6 is a structural diagram of the porous capacitor of the related art. In this figure, a porous capacitor 1 is configured as follows: a dielectric layer 4 is disposed between a pair of conductor layers (hereinafter referred to as the first conductor layer 2 and the second conductor layer 3) opposed to each other at a predetermined distance; a large number of holes 5 orthogonal to the first conductor layer 2 and the second conductor layer 3 and having a substantially straight tubular shape are formed in the dielectric layer 4; an electrode material is filled in these holes 5 to form first electrodes 6 and second electrodes 7; the first electrodes 6 are electrically connected only to one of the conductor layers (the first conductor layer 2); and the second electrodes 7 are electrically connected only to the other conductor layer (the second conductor layer 3).

The porous capacitor 1 of the related art has a large number of electrodes (the first electrodes 6 and the second electrodes 7) formed in the porous dielectric layer 4, the electrodes being connected selectively to the first conductor layer 2 and the second conductor layer 3. This arrangement increases the area of the electrode plate and thus increases the capacitance without increasing the size of the capacitor.

RELEVANT REFERENCES

List of Relevant Patent Literature

Patent Literature 1: Japanese Patent No. 4493686

SUMMARY

As described above, the related art provides the superior advantage of increasing the capacitance without increasing the size of the capacitor. A study made by the present inventors, et al., however, has revealed that the related art can be improved in insulation reliability.

As shown in FIG. 6, spaces (hereinafter "spaces 8") are disposed between the first electrodes 6 and the second conductor layer 3 and between the second electrodes 7 and the first conductor layer 2, the spaces being empty of the electrode material and serving as insulators. However, the related art is defective in that the insulation resistance of the spaces 8 is reduced when spaces 8 contain moisture from outside air.

The present invention has been accomplished to overcome the above problem; and an object of the invention is to provide a porous capacitor having increased insulation reliability.

A porous capacitor comprising: a first conductor layer having a first thickness; a second conductor layer opposed to the first conductor layer at a predetermined distance; a dielectric layer made of an oxidized valve metal and disposed between the first conductor layer and the second conductor layer, the dielectric layer having formed therein a large number of holes having an inner diameter equal to or smaller than double the first thickness and oriented substantially orthogonal to the first conductor layer and the second conductor layer; first electrodes formed of a conductive material filled in at least a part of the large number of holes, the first electrodes being electrically connected to the first conductor layer, while insulated from the second conductor layer; and second electrodes formed of a conductive material filled in at least a part of the large number of holes, the second electrodes being electrically connected to the second conductor layer, while insulated from the first conductor layer.

Various embodiments of the present invention provide porous capacitors having increased insulation reliability.

DESCRIPTION OF EXAMPLE EMBODIMENTS

Embodiments of the present invention will be described below with reference to the accompanying drawings.

Figure 1:
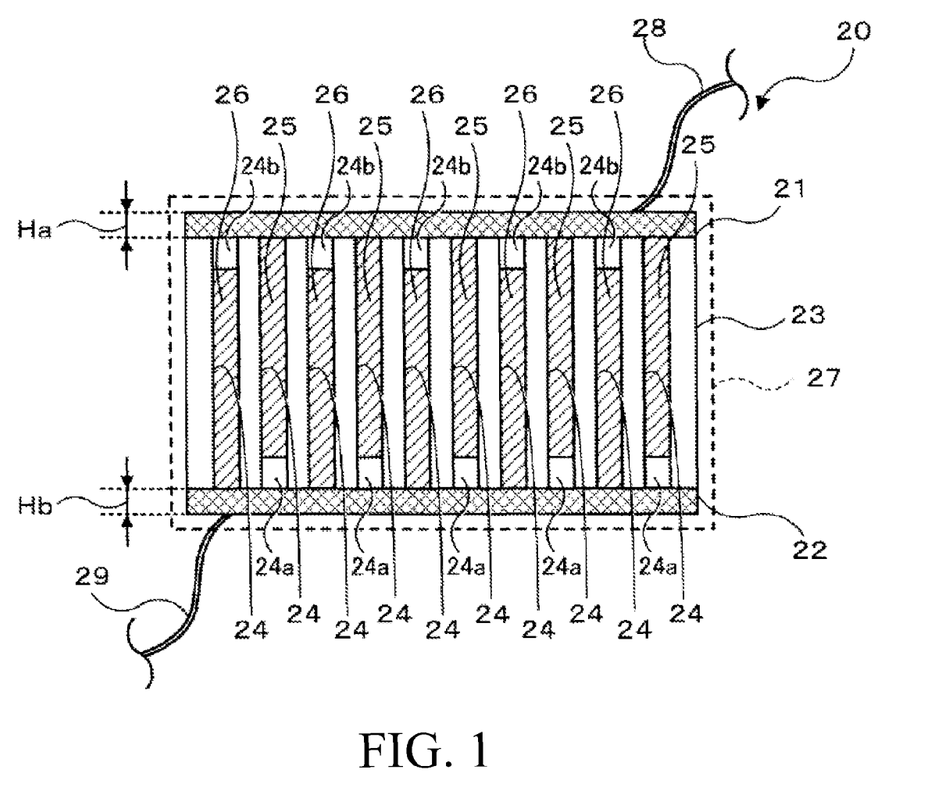
FIG. 1 is a schematic diagram showing a porous capacitor according to an embodiment.

FIG. 1 is a schematic diagram of a porous capacitor according to an embodiment. The porous capacitor 20 of the embodiment may be configured as follows: a dielectric layer 23 may be disposed between a pair of conductor layers (hereinafter referred to as the first conductor layer 21 and the second conductor layer 22) opposed to each other at a predetermined distance; a large number of holes 24 orthogonal to the first conductor layer 21 and the second conductor layer 22 and having a substantially straight tubular shape may be formed in the dielectric layer 23; an electrode material may be filled in these holes 24 to form first electrodes 25 and second electrodes 26; the first electrodes 25 may be electrically connected only to one of the conductor layers (the first conductor layer 21); and the second electrodes 26 may be electrically connected only to the other conductor layer (the second conductor layer 22).

The first electrodes 25 may be insulated from the second conductor layer 22 via spaces 24a left unfilled, and the second electrodes 26 may be likewise insulated from the first conductor layer 21 via spaces 24b left unfilled.

As a result of study on the thickness Ha of the first conductor layer 21 and the thickness Hb of the second conductor layer 22, the Inventors have found that, when Ha≥$\phi$/2 and Hb≥$\phi$/2, the first conductor layer 21 and the second conductor layer 22 can seal the spaces 24a, 24b (the spaces 24a, 24b can be formed without any crevice or opening). The symbol φ refers to the inner diameter of the holes 24. Accordingly, the above condition "Ha≥φ/2" means that "the thickness Ha of the first conductor layer 21 is equal to or greater than half of the inner diameter φ of the holes 24"; and the condition "Hb≥φ/2" means that "the thickness Hb of the second conductor layer 22 is equal to or greater than half of the inner diameter φ of the holes 24." Thus, it has been found that the thicknesses Ha, Hb of the conductor layers being equal to or greater than a predetermined value (φ/2) may inhibit insulation breakdown in an environmental load test and increase the reliability.

Figure 2A:
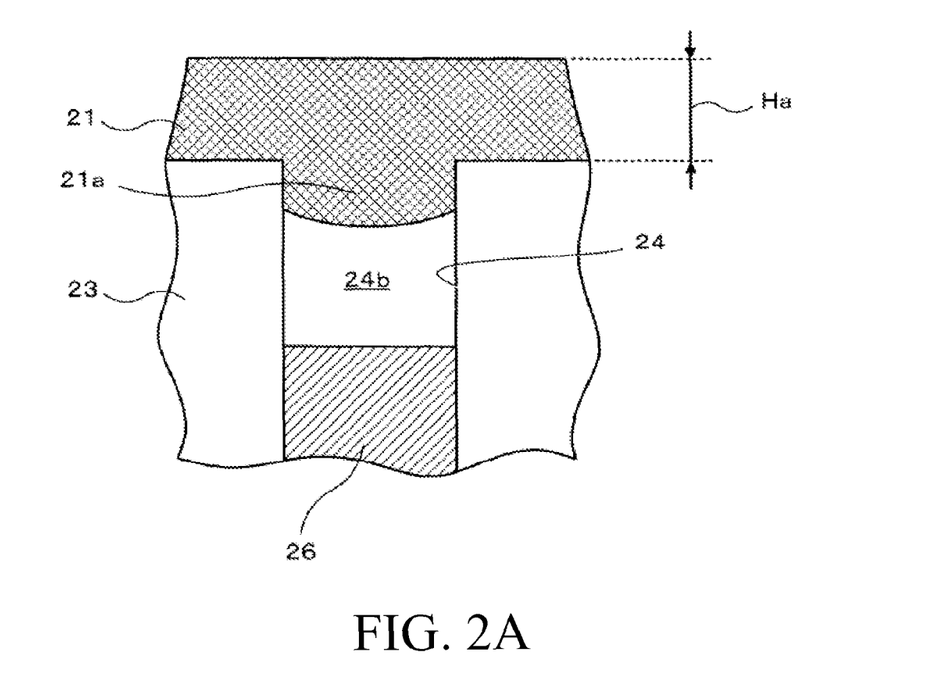
FIGS. 2A and 2B are enlarged views of spaces 24a, 24b of the porous capacitor 20.
Figure 2B:
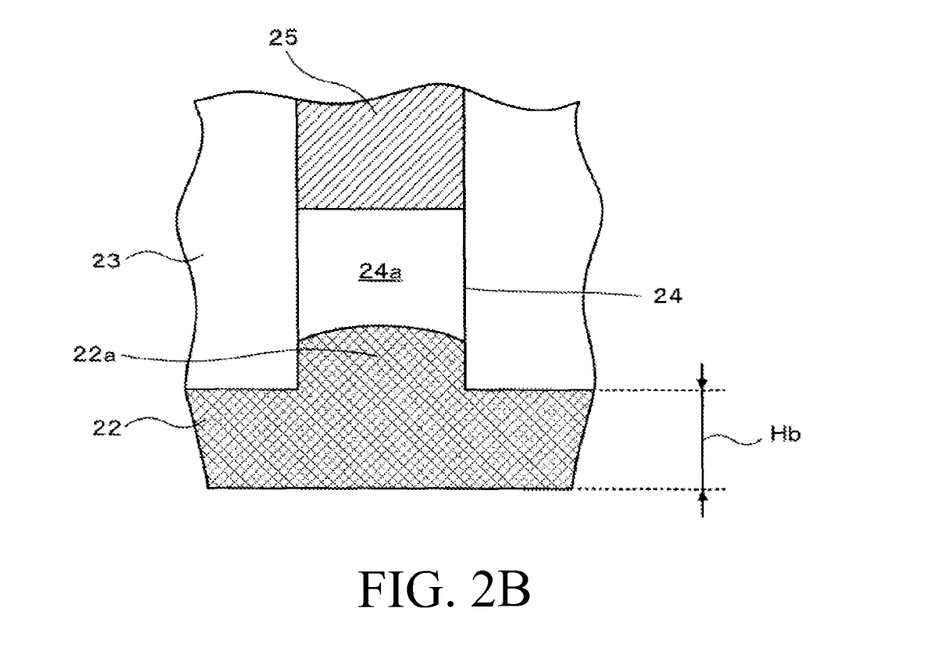

FIGS. 2A and 2B are enlarged views of spaces 24a, 24b of a porous capacitor 20. If the conductor layers are formed thick as stated above, the first conductor layer 21 and the second conductor layer 22 may penetrate into the spaces 24b, 24a to form penetration parts 21a, 22a of the conductor layers (the first conductor layer 21 and the second conductor layer 22), as shown in FIGS. 2A and 2B. The shapes of these penetration parts 21a, 22a are suited for the conductor layers to seal the spaces 24b, 24a.

The environmental load test that brought the above finding will now be described. The test involved exposure under a temperature of 85° C. and a humidity of 85% for some lengths of time (0 hrs., 5 hrs., 50 hrs., 500 hrs., and 1,000 hrs.). Additionally, the first conductor layer 21 and the second conductor layer 22 were made of Cr, Mo, W, Ti, Ta, Pt, Au, or Cu for comparison. Table 1 shows test results obtained when the thicknesses Ha, Hb of the conductor layers (the first conductor layer 21 and the second conductor layer 22) are equal to or greater than half of the inner diameter φ of the holes 24; and Table 2 shows test results obtained when the thicknesses Ha, Hb are smaller than half of the inner diameter φ of the holes 24.

TABLE 1

Thicknesses of Conductor Layers Equal to or greater than half of the inner diameter of the holes
Material of Conductor Layers

| | | Cr | Mo | W | Ti | Ta | Pt | Au | Cu |
|---|---|---|---|---|---|---|---|---|---|
| Time | 0 hrs. | ○ | ○ | ○ | ○ | ○ | ○ | ○ | ○ |
| | 5 hrs. | ○ | ○ | ○ | ○ | ○ | ○ | ○ | ○ |
| | 50 hrs. | ○ | ○ | ○ | ○ | ○ | ○ | X | X |
| | 500 hrs. | X | X | ○ | ○ | ○ | ○ | X | X |
| | 1000 hrs. | X | X | X | ○ | ○ | ○ | X | X |

TABLE 2

Thicknesses of Conductor Layers Smaller than half of the inner diameter of the holes
Material of Conductor Layers

| | | Cr | Mo | W | Ti | Ta | Pt | Au | Cu |
|---|---|---|---|---|---|---|---|---|---|
| Time | 0 hrs. | ○ | ○ | ○ | ○ | ○ | ○ | ○ | ○ |
| | 5 hrs. | X | X | X | X | X | X | X | X |
| | 50 hrs. | X | X | X | X | X | X | X | X |
| | 500 hrs. | X | X | X | X | X | X | X | X |
| | 1000 hrs. | X | X | X | X | X | X | X | X |

The symbol "○" in the table indicates that no insulation breakdown occurred; and the symbol "X" indicates that insulation breakdown occurred. To ensure the reliability of the tests, the same tests were repeated five times each using three samples. If any one of the samples underwent insulation breakdown, the test result is represented with the symbol "X". Tables 1 and 2 teach as follows.

(1) When the thicknesses Ha, Hb of the conductor layers are smaller than half of the inner diameter φ of the holes 24, insulation breakdown occurred in 5 to 1,000 hrs. of load tests for all the materials. Because the thicknesses Ha, Hb of the conductor layers were smaller than half of the inner diameter φ, the spaces 24a, 24b were insufficiently sealed; and the moisture introduced into the spaces 24a, 24b caused insulation breakdown.

(2) When the conductor layers were made of Au or Cu, the spaces 24a, 24b were defectively sealed, and thus insulation breakdown occurred in 50 to 1,000 hrs. of load tests, even if the thicknesses Ha, Hb of the conductor layers were made equal to or greater than half of the inner diameter φ of the holes 24 so as to block the holes 24. Although the spaces 24a, 24b were initially sealed sufficiently, the sealing became defective because the conductor layers were made of a soft material, Au or Cu.

(3) No insulation breakdown occurred in up to 50 hrs. of load tests when the conductor layers were made of a hard material, Ti, Ta, Cr, Mo, W, or Pt, and the thicknesses Ha, Hb of the conductor layers were equal to or greater than half of the inner diameter φ of the holes 24. Because the spaces 24a, 24b were initially sealed sufficiently, and the conductor layers were made of a hard metal material having mechanical strength, the sealing of the spaces 24a, 24b was retained relatively long.

(4) No insulation breakdown occurred in up to 1,000 hrs. of load tests when the conductor layers were made of a corrosion-resisting material, Ti, Ta, or Pt, and the thicknesses Ha, Hb of the conductor layers were equal to or greater than half of the inner diameter φ of the holes 24. Because the spaces 24a, 24b were initially sealed sufficiently, and the conductor layers were made of a corrosion-resisting metal material, the sealing of the spaces 24a, 24b was retained long.

Accordingly, the desirable requirement for improving the insulation reliability may be that the thicknesses Ha, Hb of the conductor layers (the first conductor layer 21 and the second conductor layer 22) are equal to or greater than half of the inner diameter φ of the holes 24, and the conductor layers (the first conductor layer 21 and the second conductor layer 22) are made of a corrosion-resisting material, Ti, Ta, or Pt. No insulation breakdown occurred in an exposure at least under a temperature of 85° C. and a humidity of 85% for a period exceeding 40 days (1,000 hrs.).

The second desirable requirement for improving the insulation reliability may be that the thicknesses Ha, Hb of the conductor layers (the first conductor layer 21 and the second conductor layer 22) are equal to or greater than half of the inner diameter φ of the holes 24, and the conductor layers (the first conductor layer 21 and the second conductor layer 22) are made of a hard material, Ti, Ta, Cr, Mo, W, or Pt. No insulation breakdown occurred in an exposure at least under a temperature of 85° C. and a humidity of 85% for a period almost equivalent to two days (50 hrs.).

Thus, in an embodiment, the first conductor layer 21 and the second conductor layer 22 may be made of either a hard material, Ti, Ta, Cr, Mo, W, or Pt, or a corrosion-resisting material, Ti, Ta, or Pt, among entire metals. Which material should be used depends solely on the desired resisting period against insulation breakdown. The corrosion-resisting material, Ti, Ta, or Pt, may be used to attain a long resisting period. If a resisting period is less required, the hard material, Ti, Ta, Cr, Mo, W, or Pt may be used.

The dielectric layer 23 may be made of a valve metal (such as Al, Ta, Nb, Ti, Zr, Hf, Zn, W, or Sb) that is oxidized; and the first electrodes 25 and the second electrodes 26 may be made of any metal usable for plating (such as Cu, Ni, Co, Cr, Ag, Au, Pd, Fe, Sn, Pb, or Pt) or an alloy thereof.

With such a structure, the porous capacitor 20 may be entirely covered with an insulating film 27 (exterior protection material) and is connected to external electrodes (not shown) outside the insulating film 27 through lead wires 28 and 29 drawn out from openings provided in the insulating film 27. The insulating film 27 may be made of, for example, SiO2, SiN, a resin, or a metal oxide, with a thickness of the order of tens of nanometers to tens of micrometers.

Next, the manufacturing process will be described below. FIGS. 3A to 5D are manufacturing process diagrams. The steps will be described in order.

Figure 3A:
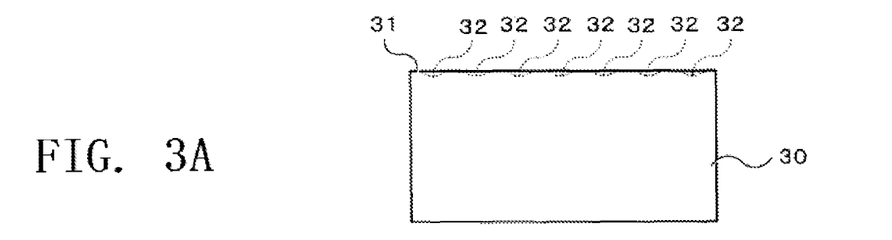
FIGS. 3A to 3E are manufacturing process diagrams (1/3).

<The Step Shown in FIG. 3A>

First, a substrate 30 made of the above mentioned valve metal such as aluminum is prepared; and the substrate 30 is provided, in the surface 31 forming the primary surface, with pits 32 for subsequent anodic oxidation (a technique for electrolytically oxidizing a metal forming an electrode) in a hexagonal closest packing arrangement. The pits 32 can be formed by urging an object made of a substance harder than the substrate 30 onto the substrate 30.

Figure 3B:
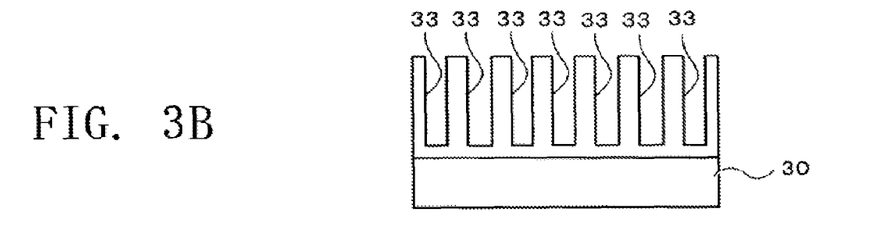

<The Step Shown in FIG. 3B>

Next, a predetermined low voltage (hereinafter referred to as the first voltage) is applied to the substrate 30 in, e.g., an oxalate solution to perform a low-voltage anodic oxidation, thereby forming a large number of holes 33 having a certain depth (a certain length) in the direction of the thickness of the substrate 30 (the vertical direction of the figure). These holes 33, which will finally be the holes 24 in FIG. 1, do not yet have the shape of the holes 24 at this stage; therefore, these holes 33 will be referred to as rough holes 44 for distinction from the holes 24.

Figure 3C:
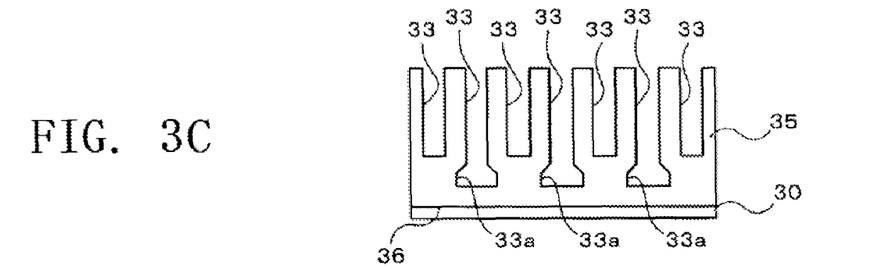

<The Step Shown in FIG. 3C>

Next, a voltage higher than the first voltage (hereinafter referred to as the second voltage) is applied to the substrate 30 in the same solution to perform a high-voltage anodic oxidation, thereby further deepening some of the rough holes 33 and forming diameter-expanded portions 33a at the bottoms of the deepened rough holes 33. Hereinafter, the rough holes 33 not having diameter-expanded portions 33a and the rough holes 33 having diameter-expanded portions 33a will be referred to as shallow rough holes 33 and deep rough holes 34, respectively, for distinction from each other.

Ideally, the shallow rough holes 33 and the deep rough holes 34 are arranged alternately; but practically, these rough holes may be arranged randomly. Additionally, the pitch between the holes formed by the anodic oxidation (the intervals between the rough holes) may increase with the applied voltage; therefore, the deep rough holes 34 formed by the higher voltage (the second voltage) may occur at a larger pitch. The pitch can be adjusted by adjusting the voltage as necessary.

The conditions of the anodic oxidation, in an oxalate solution of 0.1 mol/l at 15° C. for example, may be as follows: the first voltage ranges from several voltages to several hundred voltages; the process time with the first voltage ranges from several minutes to several days; the second voltage is several times as high as the first voltage; and the process time with the second voltage ranges from several minutes to several ten minutes. More specifically, a first voltage of 40 V may create shallow rough holes 33 at a pitch of about 100 nm, and a second voltage of 80 V may create deep rough holes 34 at a pitch of about 200 nm.

Further, a second voltage in the above range (several times as high as the first voltage) may substantially equalize the number of deep rough holes 34 and the number of the shallow rough holes 33. Thus, in the steps described below, substantially the same numbers of first electrodes 25, formed in the shallow rough holes 33, and second electrodes 26, formed in the deep rough holes 34, can be arranged randomly, thereby efficiently increasing the capacitance.

Figure 3D:
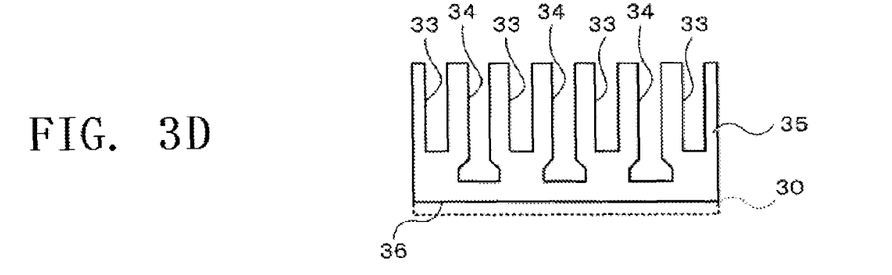

<The Step Shown in FIG. 3D>

Next, the base of the substrate 30 (unoxidized portion) may be removed with an appropriate technique such as wet etch (a technique for removing an object by a chemical reaction using a chemical agent solution) so as to expose a back surface 36 of the oxide substrate 35.

Figure 3E:
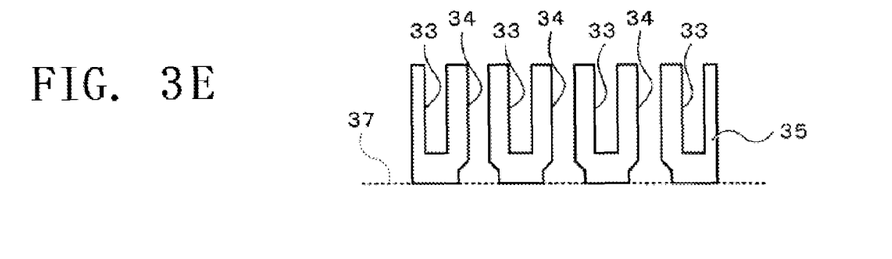

<The Step Shown in FIG. 3E>

Next, the back of the oxide substrate 35 may be removed along the broken line 37 with an appropriate technique such as reactive ion etching (RIE), thereby forming openings in the bottom of the deep rough holes 34 on the back of the oxide substrate 35.

Figure 4A:
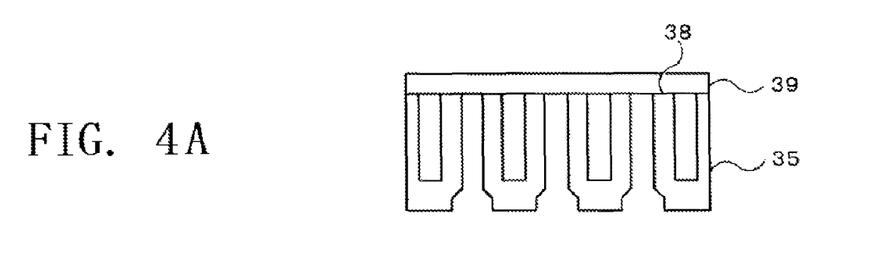
FIGS. 4A to 4E are manufacturing process diagrams (2/3).

<The Step Shown in FIG. 4A>

Next, a seed layer 39 made of a conductor may be formed on a surface 38 of the oxide substrate 35 with an appropriate technique such as physical vapor deposition (PVD).

Figure 4B:
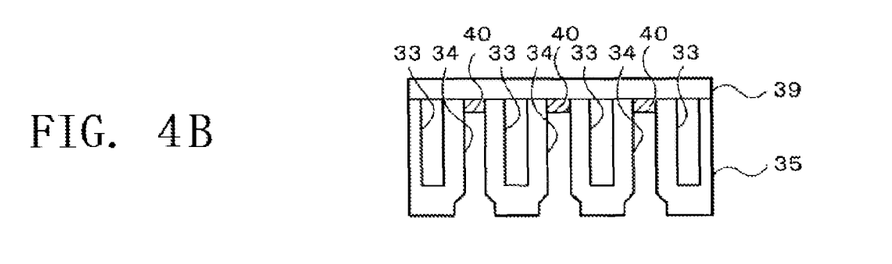

<The Step Shown in FIG. 4B>

Next, an appropriate amount of plate conductors 40 may be formed by electrolytic plating so as to be embedded inside the deep rough holes 34 on the seed layer 39 serving as a seed. In this step, the shallow rough holes 33 are closed at the ends and an electrolyte for plating is shut off; therefore, no plate conductor may be formed in the shallow rough holes 33. The plate conductors 40 may be formed in such an amount that, in the subsequent step, plate conductors inside the deep rough holes 34 can be sufficiently longer than plate conductors inside the shallow rough holes 33.

Figure 4C:
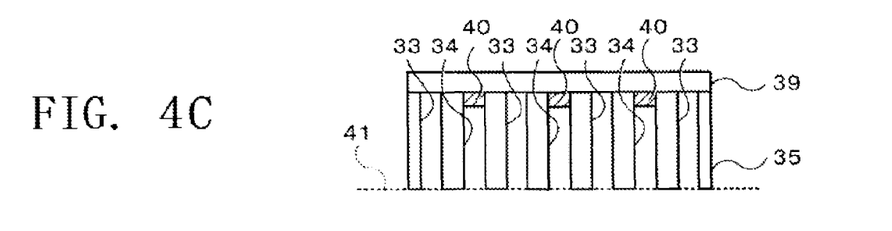

<The Step Shown in FIG. 4C>

Next, the back of the oxide substrate 35 may be removed along the broken line 41 with an appropriate technique such as reactive ion etching (RIE), thereby forming openings of the shallow rough holes 33 on the back of the oxide substrate 35. Since the deep rough holes 34 have already been provided with the openings on the back of the oxide substrate 35 in the previous step, both the shallow rough holes 33 and the deep rough holes 34 may have openings on the back of the oxide substrate 35 in this step. Accordingly, the shallow rough holes 33 and the deep rough holes 34 may form the holes 24 in the above described embodiment (FIG. 1).

Figure 4D:
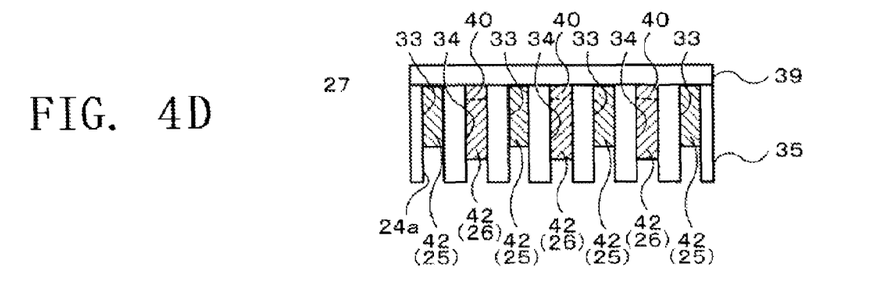

<The Step Shown in FIG. 4D>

Next, plate conductors 42 may be grown and formed by electrolytic plating both inside the shallow rough holes 33 and inside the deep rough holes 34 on the seed layer 39 serving as a seed. Since the deep rough holes 34 already have the plate conductors 40 embedded therein in the previous step, the amount of plating embedded in the deep rough holes 34 may be equal to the sum of the amounts of the plate conductor 40 and the plate conductor 42. In contrast, the amount of plating embedded in the shallow rough holes 33 may be equal to the amount of the plate conductor 42 only.

Thus, inside the shallow rough holes 33 may be formed electrodes made of the plate conductors 42 to serve as the first electrodes 25; and inside the deep rough holes 34 may be formed electrodes made of the plate conductors 40 and the plate conductors 42 to serve as the second electrodes 26. That is, due to the presence of the plate conductors 40 shown in FIG. 4B, all of the second electrodes 26 may be formed longer than the first electrodes 25 toward the back surface.

Figure 4E:
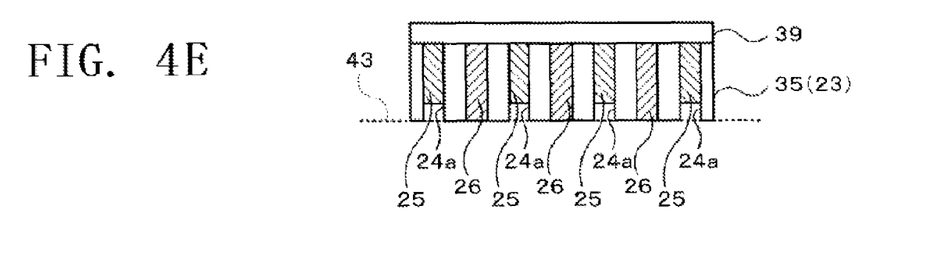

<The Step Shown in FIG. 4E>

Next, the back of the oxide substrate 35 may be removed along the broken line 43 with an appropriate technique such as chemical-mechanical polishing (CMP), so as to expose the bottom surfaces of the second electrodes 26 on the back of the oxide substrate 35 and to form spaces 24a on the bottom surfaces of the first electrodes 25, the spaces 24a having random depths within a predetermined range. Additionally, the oxide substrate 35 may serve as the dielectric layer 23 shown in FIG. 1.

Figure 5A:
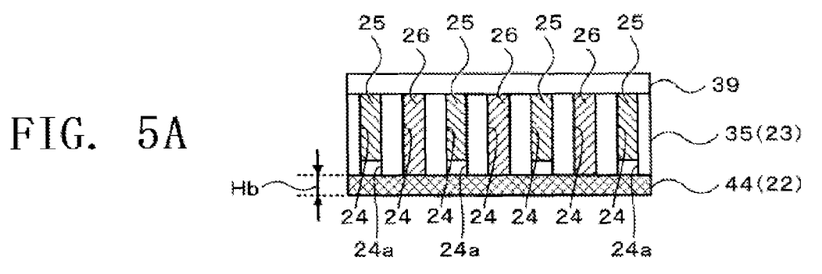
FIGS. 5A to 5D are manufacturing process diagrams (3/3).

<The Step Shown in FIG. 5A>

Next, a conductor layer 44 for serving as the second conductor layer 22 may be formed on the back surface of the oxide substrate 35 with an appropriate technique such as physical vapor deposition (PVD). The thickness Hb of the conductor layer 44 may be equal to or greater than half of the inner diameter φ of the holes 24; that is, for example, Hb≥15 nm when the inner diameter φ of the holes 24 is 30 nm; and the conductor layer 44 may be made of either a corrosion-resisting material, Ti, Ta, or Pt, or a hard material, Ti, Ta, Cr, Mo, W, or Pt. The thickness Hb of the conductor layer 44 can be adjusted to a desired amount by selecting the conditions of physical vapor deposition, etc. For example, in the case where the distance between the target material and one surface of the dielectric layer on which the conductor layer is to be formed is 50 mm, the chamber pressure may be set to 5 Pa. The sputtering apparatus may be, for example, CS-200 from ULVAC, Inc. Since the thicknesses of the conductor layers may be almost proportional to the sputtering period as long as other conditions are the same, the thickness Hb can be adjusted to a desired amount by time management.

Figure 5B:
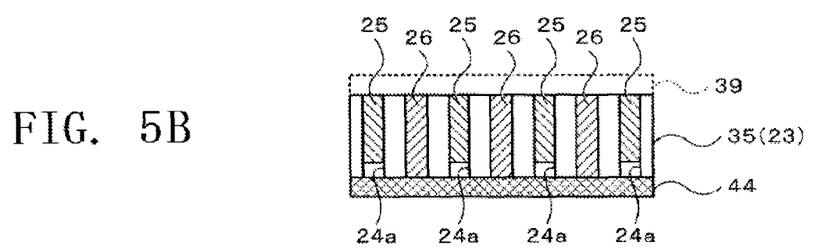

<The Step Shown in FIG. 5B>

Next, the seed layer 39 may be removed with an appropriate technique such as CMP to expose the top surfaces of the first electrodes 25 and the second electrodes 26 on the front surface of the oxide substrate 35.

Figure 5C:
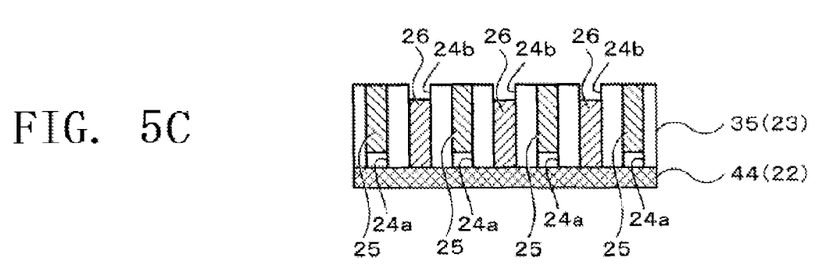

<The Step Shown in FIG. 5C>

Next, the lengths of the second electrodes 26 may be adjusted by electrolytic etching to form spaces 24b on the top of the second electrodes 26.

Figure 5D:
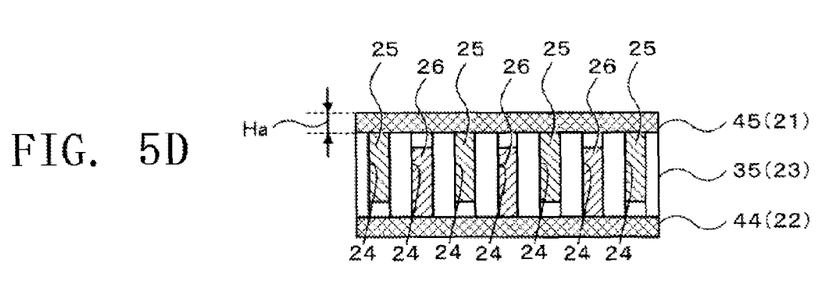

<The Step Shown in FIG. 5D>

Finally, a conductor layer 45 for serving as the first conductor layer 21 may be formed on the front of the oxide substrate 35 with an appropriate technique such as PVD; lead wires (lead wires 28 and 29 shown in FIG. 1) may be provided to the conductor layer 45 (the first conductor layer 21) and the conductor layer 44 (the second conductor layer 22), respectively; and then the entire body may be covered with an insulating film (the insulating film 27 shown in FIG. 1). Further, the ends of the lead wires may be connected to external electrodes (not shown) disposed outside the insulating film. The thickness Ha of the conductor layer 45 may be equal to or greater than half of the inner diameter φ of the holes 24; that is, for example, Hb≥15 nm when the inner diameter φ of the holes 24 is 30 nm; and the conductor layer 45 may be made of either a corrosion-resisting material, Ti, Ta, or Pt, or a hard material, Ti, Ta, Cr, Mo, W, or Pt. The thickness Ha of the conductor layer 45 can be adjusted in the same manner as the thickness Hb of the conductor layer 44.

Thus, if the thickness Ha of the first conductor layer 21 is equal to or greater than half of the inner diameter φ of the holes 24, and the thickness Hb of the second conductor layer 22 is equal to or greater than half of the inner diameter φ of the holes 24, the completed porous capacitor 20 may have a structure where the opened ends of the spaces 24a, 24b (the ends adjacent to the first conductor layer 21 or the second conductor layer 22) are securely sealed by the first conductor layer 21 and the second conductor layer 22.

In a porous capacitor 20 according to the embodiment having such a structure, spaces 24a, 24b of holes 24 may be sealed at opened ends thereof by conductor layers (a first conductor layer 21 and a second conductor layer 22) to guard against moisture and improve the insulation reliability.

Further, if the conductor layers (the first conductor layer 21 and the second conductor layer 22) are made of a hard material, Ti, Ta, Cr, Mo, W, or Pt, these conductor layers may resist handling and thus prevent the breach of sealing of the holes 24, further improving the insulation reliability.

Further, if the conductor layers (the first conductor layer 21 and the second conductor layer 22) are made of a corrosion-resisting material, Ti, Ta, or Pt, these conductor layers may prevent the breach of sealing of the holes 24 even under a high temperature and a high humidity for a long period, further improving the insulation reliability.

In the above description, the conductor layers only include the first conductor layer 21 in the top and the second conductor layer 22 in the bottom. However, the present invention is not limited to such an embodiment. The porous capacitor of the present invention may further comprise a stacked conductor layer (stacked on the first conductor layer 21 or the second conductor layer 22) that is separated from the holes 24. In this case, a stacked conductor layer made of Cu or Au may reduce the electrical resistance of the conductor layer.

Additionally, an embodiment in which only one of the conductor layers has a thickness (i.e., Ha or Hb) equal to or greater than half of the inner diameter of the holes may also provide an adequate effect.

LIST OF REFERENCE NUMBERS

Ha thickness of a first conductor layer
Hb thickness of a second conductor layer
20 porous capacitor
21 first conductor layer
22 second conductor layer
23 dielectric layer (oxide substrate)
24 hole
24a space (insulating part)
24b space (insulating part)
25 first electrode
26 second electrode

What is claimed is:

1. A porous capacitor comprising:
a first conductor layer having a first thickness;
a second conductor layer opposed to the first conductor layer at a predetermined distance;
a dielectric layer made of an oxidized valve metal and disposed between the first conductor layer and the second conductor layer, the dielectric layer having formed therein a large number of holes and oriented substantially orthogonal to the first conductor layer and the second conductor layer;
first electrodes formed of a conductive material filled in at least a part of the large number of holes, the first electrodes being electrically connected to the first conductor layer, while insulated from the second conductor layer; and
second electrodes formed of a conductive material filled in at least a part of the large number of holes, the second electrodes being electrically connected to the second conductor layer, while insulated from the first conductor layer,
wherein the first thickness is equal to or greater than half of the inner diameter of the holes and smaller than the inner diameter of the holes, and
wherein the first conductor layer and/or the second conductor layer is formed of Ti, Ta, Mo or W.

2. The porous capacitor of claim 1, wherein the second conductor layer has a second thickness equal to or greater than half of the inner diameter of the holes.

3. The porous capacitor of claim 1, wherein the first conductor layer and/or the second conductor layer is formed of Ti, Ta, Cr, Mo, W, or Pt.

4. The porous capacitor of claim 1 wherein the first conductor layer and/or the second conductor layer is formed of Ti, Ta, or Pt.

* * * * *